UNITED STATES PATENT OFFICE.

WILLIAM N. SAGE, OF KEOKUK, IOWA.

PROCESS FOR UTILIZING WASTE PRODUCTS FROM THE MANUFACTURE OF STARCH FROM CORN.

1,187,392.  Specification of Letters Patent.  Patented June 13, 1916.

No Drawing.  Application filed April 30, 1915. Serial No. 25,057.

*To all whom it may concern:*

Be it known that I, WILLIAM N. SAGE, a citizen of the United States, residing at Keokuk, in the county of Lee and State of Iowa, have invented a certain new and useful Improvement in Processes for Utilizing Waste Products from the Manufacture of Starch from Corn, of which the following is a full, clear, concise, and exact description.

My invention relates to processes for utilizing waste products from the manufacture of starch from corn and has for its object the provision of a process in which products which are left from the manufacture of starch, corn syrup, and by-products from corn may be utilized.

It may be stated in general that out of approximately 56# of corn which are contained in the bushel, that the resultant products are 28.8# of starch, 13.5# of feed (hulls and germ meal), and 1.25# of corn oil. There is a loss of about 4.6# of soluble matter which is found in the waste water used during the above steps in converting the corn into the products before mentioned. Generally speaking this 4.6# of soluble matter in certain specific instances is made up about as follows: 50.00 to 60.00% crude protein or nitrogenous matter; 5.00 to 8.00% dextrose and dextrins; 5.00 to 10.00% potash salts; 10.00 to 20.00% phosphates, and 3.00 to 5.00% calcium salts.

My new and improved process deals with the saving of all or a portion of the 4.6# of soluble matter above referred to and which hitherto has been considered as a waste and loss. In carrying out my process I begin with this waste material in the condition it is left by the preliminary steps, namely as it is found in solution with water. This material I may or may not heat as I find it advisable, and this heating may be the first step in carrying out the process. I then mix the solution with slake lime and deposit it in a tank where it is suitably agitated and where precipitates may be formed. From this tank the mixture flows through an orifice near its bottom into a second tank where this mixture is again agitated. It may be pointed out here that this agitation prevents settling among other things. The mixture is then drawn off from this second tank through a pipe which leaves the same near its lower portion. This pipe leads into a third tank or receptacle and extends into the lower portion of this third receptacle where it discharges the mixture flowing from the second receptacle. From this third receptacle there is an outlet pipe at the top thereof which is a sort of an over flow to draw off the waste liquid. The material from this third receptacle passes out through a pipe leading from its lower portion and is forced by means of a pump into a standard form of press. It may be said that in the third receptacle the precipitates and solid material settle to the bottom and the clear water runs off at the top through the overflow. In the press the materials are suitably acted upon to force out the water. The damp residue which comes from the press is then preferably dropped on to a conveyer from whence it may go to a drying kiln. The products which are then taken from the drying kiln are available as fertilizer or for other uses as may be determined.

From what has thus been described the nature of my invention will be readily clear to those skilled in the art.

Having however thus described one form which my invention may take, what I claim as new and desire to secure by Letters Patent is:

1. The herein described process of reclaiming soluble products in the waste liquors from the manufacture of starch and similar liquors from corn which consists in mixing the waste products with lime, agitating the mixture to prevent settling, withdrawing the mixture into a settling tank, forcing the sediment into a press, and then further drying the sediment after leaving said press.

2. The herein described process of reclaiming soluble products in the waste liquors from the manufacture of starch and similar liquors from corn which consists in mixing the waste products with lime, agitating the mixture to prevent settling, withdrawing the mixture into a settling tank, drawing off the liquid on the top of said settling tank, forcing the sediment into a press, and then further drying the sediment after leaving said press.

3. The herein described process of reclaiming soluble products in the waste liquors from the manufacture of starch and similar liquors from corn which consists in mixing the waste products with lime, agitating the mixture to prevent settling, drawing off said mixture into a receptacle and agitating the same within said receptacle, withdrawing the mixture into a settling tank, forcing the sediment into a press, and then further drying the sediment after leaving said press.

In witness whereof, I hereunto subscribe my name this 9th day of April, A. D., 1915.

WILLIAM N. SAGE.

Witnesses:
HAZEL ANN JONES,
MAX W. ZABEL.